United States Patent
Viebahn et al.

(10) Patent No.: US 6,607,005 B2
(45) Date of Patent: Aug. 19, 2003

(54) FUEL TANK

(75) Inventors: Reiner Viebahn, Neuwied (DE); Dirk Bolle, Bonn (DE); Torsten Homburg, Reutlingen (DE)

(73) Assignee: Kautex Textron GmbH & Co. KG, Bonn (DE)

( * ) Notice: Subject to any disclaimer, the term of this patent is extended or adjusted under 35 U.S.C. 154(b) by 0 days.

(21) Appl. No.: 10/008,858

(22) Filed: Nov. 8, 2001

(65) Prior Publication Data

US 2002/0148510 A1 Oct. 17, 2002

(30) Foreign Application Priority Data

Nov. 8, 2000 (DE) .......................................... 100 55 355

(51) Int. Cl.[7] .............................................. F02M 33/02
(52) U.S. Cl. ........................ 137/574; 137/142; 137/147; 137/587; 137/565.22; 123/510; 123/514
(58) Field of Search .................................. 137/142, 147, 137/565.22, 574, 587; 123/510, 514

(56) References Cited

U.S. PATENT DOCUMENTS

| | | | | |
|---|---|---|---|---|
| 2,530,819 A | * | 11/1950 | Hamlin ........................ 137/266 |
| 3,021,855 A | * | 2/1962 | Cartwright et al. ......... 137/142 |
| 3,083,720 A | * | 4/1963 | Cartwright et al. ......... 137/142 |
| 4,703,771 A | | 11/1987 | Mimura ....................... 137/142 |
| 4,838,307 A | * | 6/1989 | Sasaki et al. ................ 137/574 |
| 4,951,699 A | | 8/1990 | Lipman ....................... 137/142 |
| 5,078,169 A | * | 1/1992 | Scheurenbrand et al. ... 137/574 |
| 5,732,684 A | * | 3/1998 | Thompson .................. 123/514 |
| 5,782,223 A | * | 7/1998 | Yamashita et al. .......... 123/510 |
| 5,979,485 A | | 11/1999 | Tuckey et al. ............... 137/143 |
| 5,983,932 A | * | 11/1999 | Wagner et al. .............. 137/587 |
| 6,113,354 A | * | 9/2000 | Meese et al. ................ 123/514 |
| 6,240,958 B1 | | 6/2001 | Streubel et al. ............. 137/588 |
| 6,283,142 B1 | * | 9/2001 | Wheeler et al. ............. 137/265 |
| 6,371,153 B1 | * | 4/2002 | Fischerkeller et al. ...... 137/265 |
| 6,505,644 B2 | * | 1/2003 | Coha et al. ............. 137/565.22 |

FOREIGN PATENT DOCUMENTS

| | | | |
|---|---|---|---|
| DE | 39 40 060 C2 | 7/1991 | ............. F04F/5/54 |
| DE | 43 01 762 A1 | 7/1994 | .......... F02M/37/00 |
| DE | 44 00 919 A1 | 7/1995 | ............. F04F/5/54 |
| EP | 0 228 176 B1 | 11/1990 | .......... F02M/37/00 |
| EP | 0 997 336 A1 | 10/1999 | ........... B60K/15/03 |
| FR | 2 709 452 A1 | 9/1993 | ......... B60K/15/063 |
| JP | 05087006 | 4/1993 | .......... F02M/37/00 |

* cited by examiner

*Primary Examiner*—John Rivell
(74) *Attorney, Agent, or Firm*—Grossman, Tucker, Perreault & Pflegger, PLLC

(57) ABSTRACT

A fuel tank for a motor vehicle defining at least two interconnecting with the intercommunication being by way of a tank region of smaller cross-section than the chambers, defining a saddle tank configuration. A first of the chambers contains a fuel delivery unit and a second of the chambers has a refuelling vent valve which is the only refuelling vent valve of the tank. The two chambers also communicate with each other by way of a compensating line on the basis of the principle of communicating vessels. The tank also has means for venting the compensating line. The compensating line is such that equalisation of the filling levels of the intercommunicating chambers is possible only when there is a drop in level from the second chamber to the first chamber.

10 Claims, 2 Drawing Sheets

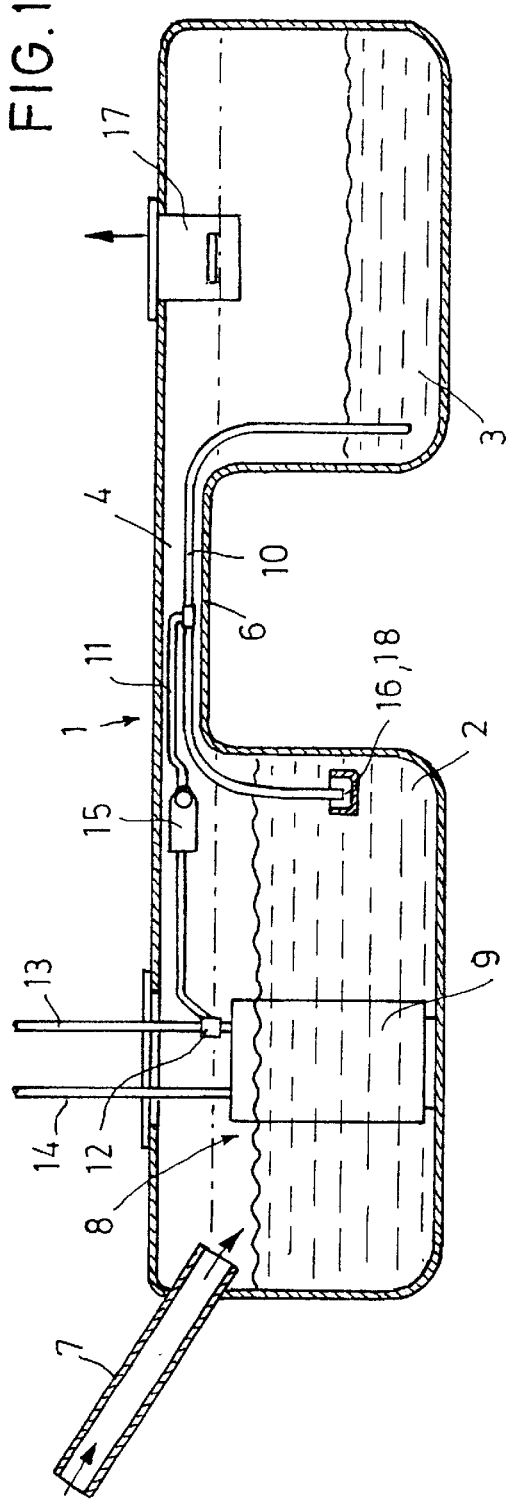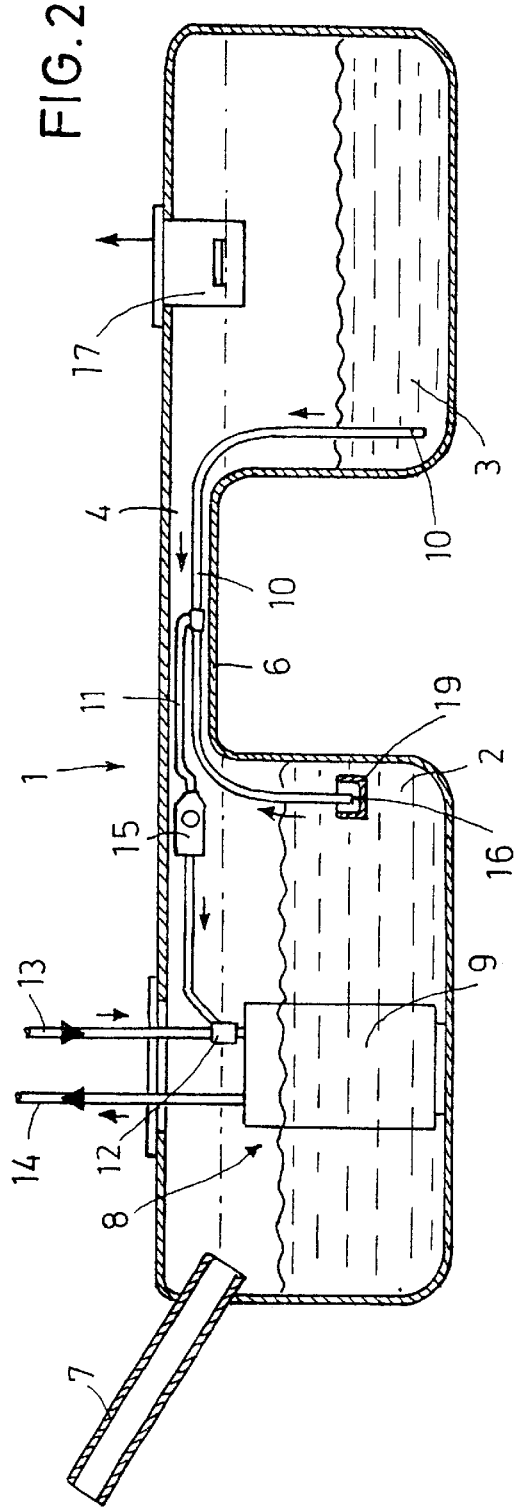

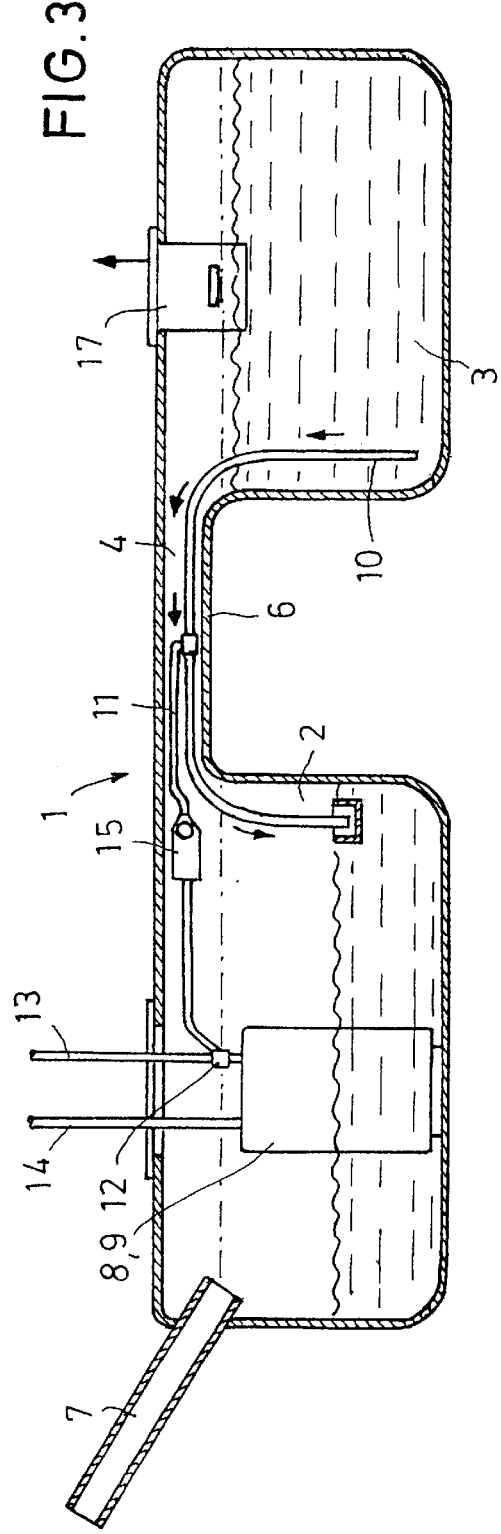
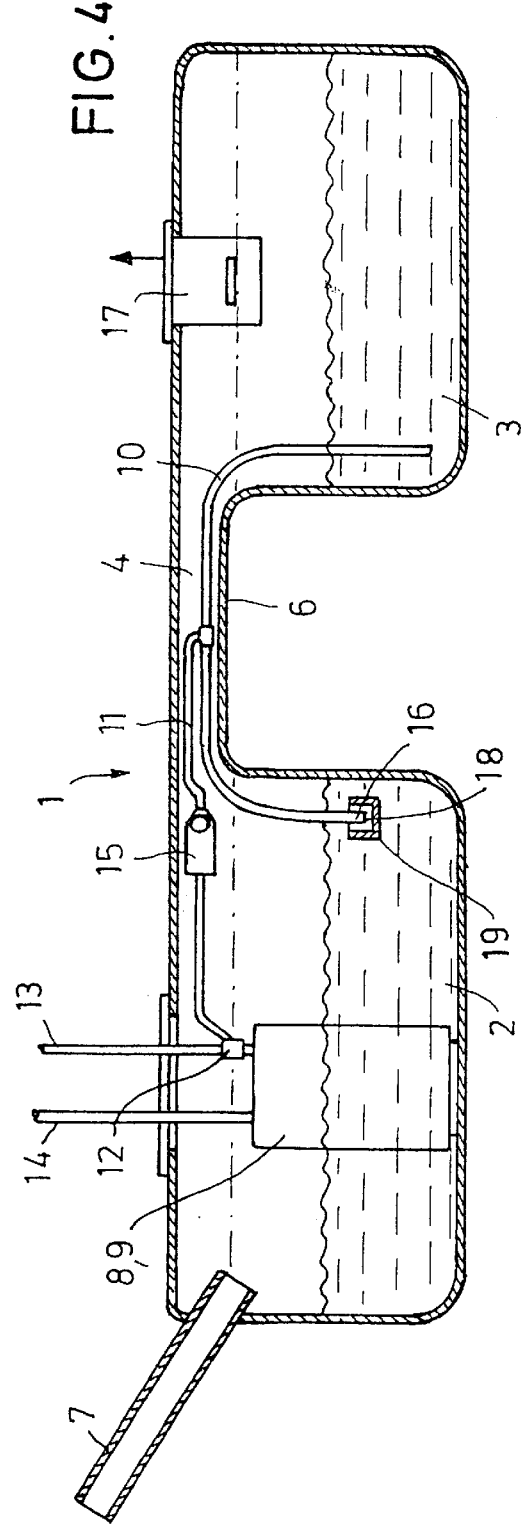

FUEL TANK

FIELD OF THE INVENTION

The invention concerns generally a fuel tank and more particularly a fuel tank for a motor vehicle.

BACKGROUND OF THE INVENTION

One form of fuel tank, generally referred to as a saddle tank, is formed by at least first and second tank regions of relatively large cross-section which form respective communicating sub-volumes of the tank. Those tank regions are in communication with each other by way of a further tank region of smaller cross-section. When considered in the position of installation of the tank, the tank region of smaller cross-section is formed by the bottom of the tank being displaced upwardly, whereby the bottom of the tank in the area of the tank region of smaller cross-section forms an inverted generally U-shaped configuration, whence the name saddle tank. The tank has at least one fuel delivery unit in the first tank region, and it also has means for venting the tank. There is at least one compensating or equalising line which intercommunicates the first and second tank regions on the basis of the principle of communicating tubes. The compensating line also has means for venting thereof.

By virtue of their saddle configuration such tanks are used primarily in relation to rear wheel drive motor vehicles where the tanks can be appropriately arranged over drive components, for example a universally joined shaft, or over parts of the exhaust system of the vehicle. For that purpose, in the region of the bottom, as indicated above the fuel tank has a recess extending upwardly into the tank which generally subdivides the tank into first and second tank regions of relatively large cross-section, constituting thus first and second tank chambers. For structural reasons and also for reasons which are relevant in terms of safety, those tank chambers do not have any communicating lines forming a communication therebetween, at a low level relative to the tank. In general, one of the first and second tank regions of relatively large cross-section accommodates the fuel delivery unit which comprises an electric fuel pump arranged in a reservoir which is also referred to as a surge pot or swirl pot. The reservoir ensures that the fuel pump is always supplied with fuel in all possible travel conditions and attitudes of the motor vehicle. As therefore fuel is conveyed to the engine only from a part of the fuel tank, namely the first tank region in which the fuel delivery unit is disposed, it is necessary to ensure that the fuel in the other regions of the fuel tank are also appropriately fed to the fuel pump. In general that is implemented by means of one or more suction jet pumps which are driven by way of a partial flow of fuel which is branched off the delivery flow of fuel to the engine or by a fuel return flow from the engine. Such suction jet pumps in which a jet of fuel, also referred to as the drive jet, in a branching from a fuel line produces a delivery suction action, are known units and can be found for example in DE 39 40 060 C2 to which reference may be made for a more detailed description of such a pump and the disclosure of which is thereby incorporated into this specification. In that way, by means of one or more suction jet pumps, fuel at other levels or in other sub-volumes of the fuel tank is continuously fed to the reservoir of the fuel delivery unit so that in terms of emptying the fuel tank it is possible to ensure that no unused fuel remains in parts of the fuel tank.

When the vehicle in which the tank is fitted is an inclined position or in different conditions of acceleration, particularly when the vehicle is subjected to transverse acceleration forces in bends, the design configuration of such a saddle tank in which the upwardly extending recess configuration in the bottom of the tank forms the saddle-shaped raised configuration in the interior of the tank means that it is quite possible for fuel to flow over from one tank chamber into the other, thereby resulting in different filling levels in the tank chambers. Such differences in level are generally not critical in regard to an adequate supply of fuel to the fuel pump in operation of the motor vehicle, but nonetheless it would still be desirable if the level of fuel in that region of the tank in which the fuel pump is disposed were higher than in the second tank region which is generally in opposite relationship to the first tank region transversely with respect to the longitudinal axis of the vehicle in which the tank is fitted.

It will further be noted that differences in level between the first and second tank regions of the tank, that is to say the two tank chambers defined thereby, can give rise to problems when refuelling the motor vehicle, particularly when the fuel in one chamber of the tank reaches a level at which a refuelling vent valve provided therein responds, although the maximum filling level has not yet been reached in the respective other chamber of the tank. In that case, the automatic shut-off valve in the refuelling gun shuts off prematurely in the refuelling procedure, with the consequence that the tank cannot be completely filled. That problem can occur in particular if the saddle configuration provided in the tank between the first and second tank regions is particularly pronounced and the refuelling vent valve shut-off level in at least one tank chamber is below the level of the top surface of the saddle configuration, so that equalisation of the levels in the chambers by virtue of fuel flowing across from one chamber into the other could occur only after the refuelling vent valve has responded.

It would be possible to avoid that by the provision of a refuelling vent valve in each chamber of the tank, so that the automatic shut-off valve in the refuelling gun will shut off only when both refuelling vent valves in the tank respond. That however involves the disadvantage that, in a situation in which the first refuelling vent valve to respond in a refuelling procedure is that which is disposed in the chamber into which the filler pipe of the tank does not open, there is the possibility of the tank chamber in question being overfilled so that the tank no longer has a sufficient expansion volume therein for possible expansion of the fuel. The other situation in which the refuelling vent valve in the chamber with the tank filling pipe responds first is not critical for the fuel can flow across from that chamber into the other chamber. It will be seen therefore that, with such a tank design configuration, it is not always possible to guarantee that the shut-off valve in the refuelling gun shuts off at the same filling level in the tank chambers.

For the purposes of equalising the filling levels in various chambers in a tank system, for example EP 0 228 167 involves a system wherein various chambers of a tank are in communication with each other by way of a compensating line or conduit, based on the principle of communicating vessels. It will be noted however that this involves ensuring the same filling level in the different volumes of the tank, both when the vehicle is stationary and also when it is in operation, although, as indicated above, that may not always be desirable.

A comparable arrangement for the purposes of equalising the levels of fuel in different volumes of a tank is to be found in DE 44 00 919 A1 describing a saddle tank of the general configuration referred to hereinbefore. In this case, the levels of fuel in the two chambers of the saddle tank are also equalised by means of a compensating line which is in the form of a siphon. The compensating line is communicated by way of a branch therefrom to a vacuum chamber of a suction jet pump which is operated by the return flow of fuel from the engine back to the tank. That arrangement ensures that any air or gas which has accumulated in the compensating line can be removed therefrom so that equalisation of the levels of fuel in the tank chambers can take place irrespective of fuel being removed by suction from the compensating line, which can happen in that situation.

That design is disadvantageous however insofar as an identical level of fuel in each of the tank chambers is guaranteed only if the vehicle is not transversely inclined. If the vehicle is transversely inclined when the tank is being refilled it is still not possible to ensure that the automatic shut-off valve in the refuelling gun shuts off when the level of fuel in the chambers is the same. In addition such a design configuration not only suffers from disadvantages in terms of refuelling, but moreover when the vehicle is stopped in a transversely inclined position and in particular when there is a low level of fuel in the tank, there is also the risk that the fuel can run from that chamber in which the fuel pump is disposed into the respective other chamber so that under some circumstances the fuel pump may no longer be adequately supplied with fuel.

SUMMARY OF THE INVENTION

An object of the present invention is to design a fuel tank in such a way that premature shut-down of the refuelling procedure and also overfilling of a tank chamber can be reliably avoided, using comparatively simple structural means.

Another object of the present invention is to provide a saddle-type fuel tank so designed as to ensure adequate filling of a tank chamber which accommodates a fuel pump.

Still another object of the invention is to provide a saddle fuel tank so designed as to ensure a certain minimum filling level of fuel in a first chamber thereof while on the other hand ensuring that a refuelling gun shuts off in a refuelling procedure when the levels of fuel in the tank chambers are at least approximately equal.

In accordance with the principles of the present invention the foregoing and other objects are attained by a fuel tank for a motor vehicle comprising at least first and second tank regions of relatively large cross-section, which form respective communicating sub-volumes or chambers of the tank. The first and second tank regions are in communication with each other by way of a further tank region of smaller cross-section. The tank region of smaller cross-section, in the position of installation of the tank, forms a constriction disposed in the upper part of the tank, between the first and second tank regions. At least one fuel delivery unit is disposed in the first tank region, and means for venting the tank are in the form of only a single common refuelling vent valve for the first and second regions of the tank, being arranged in the second tank region. At least one compensating line interconnects the first and second tank regions on the basis of the principle of communicating tubes. The compensating line is such that compensation or equalisation of the filling levels of the intercommunicating first and second tank regions is possible at least with a low filling level only in the event of such a drop in level at which the filling level in the first tank region is less than in the other regions of the tank.

As will be seen from a description hereinafter of a preferred embodiment of a fuel tank in accordance with the principles of the present invention, the tank configuration according to the invention ensures that, particularly when the engine of the motor vehicle in which the tank is fitted is stopped, equalisation of the levels of fuel as between the first and second tank regions of larger cross-section, which can also be referred to hereinafter for the sake of simplicity merely as the chambers, can take place in such a way that fuel can flow from the second chamber into the first chamber, but no fuel can flow back from the first chamber into the second chamber at least when the level of fuel falls below a given level. That has the advantage on the one hand that a certain minimum level of fuel in the first chamber is always guaranteed, and on the other hand the refuelling gun shuts off in a refuelling procedure when the level of fuel in the chambers is at least approximately the same.

It will be apparent that the problems involved with a saddle tank arise particularly when the tank is of an especially pronounced saddle configuration with the bottom of the tank constituting a large upwardly incursion into the volume of the tank to define respective chambers on each side thereof, in which case the tank region of smaller cross-section forming the communication between the chambers is of a particularly small volume so that equalisation of level of the fuel in the two chambers, by virtue of flowing across from one chamber into another, can only take place at a comparatively late stage and possibly after the refuelling vent valve has already responded.

In a particularly preferred feature of the tank according to the invention the compensating line has a first end opening into the first tank region at a higher level than in the second tank region. That affords a fuel backflow blocking effect from the first chamber into the second chamber only when the fuel falls below a given level.

Alternatively, in another preferred feature of the invention, a non-return valve or check valve can be provided in the first end of the compensating line. In that case the compensating line can be taken in both chambers approximately as far as the bottom thereof.

In the structure where the first end of the compensating line opens into the first tank region at a higher level than in the second tank region, it is desirable for the first end of the compensating line to open into an overflow container which accommodates that end of the compensating line. In that case, in the event of movements of the vehicle causing fuel surge or also when the vehicle is subjected to acceleration forces in the transverse and/or longitudinal directions, this configuration ensures that the first end of the compensating line remains immersed in fuel so that no air is drawn into the compensating line.

In a further preferred feature the compensating line can be connected by way of a branch connection to a reduced-pressure line, preferably at the highest location on the compensating line when considering the position of installation of the fuel tank, so that gases which possibly accumulate in the compensating line can be withdrawn therefrom. In that respect, the amount of fuel conveyed therein is to be comparatively small, and the cross-section of the compensating line can be so selected that it operates as a siphon, even when no reduced pressure is operative, for example when the engine is stopped.

In a preferred feature of this arrangement the reduced-pressure line can be connected for example to a pump which is operated by way of a partial flow of fuel which is branched from the fuel delivery flow produced by the fuel delivery unit or from a return flow of fuel from the engine back to the tank.

As an alternative it is possible to use an electric pump for venting the compensating line. That electric pump can be a separate electric pump. Alternatively for example venting of the compensating line can be effected by way of a second pump stage of the fuel delivery pump of the fuel delivery unit. That configuration is less preferred than the use of a separate electric pump however as using a second pump stage in that way has a lower level of efficiency in terms of conveying gas.

In a further preferred feature at least one check valve may be provided in the reduced-pressure line so as to ensure that the compensating line does not empty when the engine is stopped.

Further objects, features and advantages of the invention will be apparent from the description hereinafter of a preferred embodiment.

BRIEF DESCRIPTION OF THE DRAWING

FIG. 1 is a diagrammatic view of a fuel tank according to the invention in a refuelling procedure, FIG. 2 shows the fuel tank of FIG. 1 during operation of the motor vehicle engine to which the fuel tank is connected, and FIGS. 3 and 4 show two filling levels of the fuel tank according to the invention immediately prior to a refuelling procedure in chronological sequence.

DESCRIPTION OF THE PREFERRED EMBODIMENT

Referring firstly to FIGS. 1 and 2, reference numeral 1 therein generally denotes a fuel tank according to the invention, in the form of a saddle tank comprising first and second tank regions of relatively large cross-section which respectively form a first chamber indicated at 2 and a second chamber indicated at 3. The first and second chambers 2 and 3 are connected together for flow communication therebetween by way of a further tank region 4 of smaller cross-section. The bottom as indicated at 5 of the fuel tank 1 constitutes an upward incursion into the interior of the fuel tank 1, forming an inverted generally U-shaped configuration as a saddle 6 between the first and second chambers 2 and 3.

The fuel tank 1 is further provided with a filler pipe 7 which opens into the first chamber 2. Also arranged in the first chamber 2 is a fuel delivery unit as generally indicated by 8 and comprising a fuel pump (not shown) and a reservoir 9 surrounding the fuel pump and acting as a surge pot. The reservoir 9 ensures in the usual manner that there is a supply of fuel for the fuel pump enclosed therein.

The first and second chambers 2 and 3 are connected to each other by way of a compensating or equalising line 10, based on the principle of communicating tubes or vessels. As long as the cross-section of the compensating line 10 is completely filled with fuel it acts as a siphon and provides for equalisation of the fuel levels as between the two chambers 2, 3. The cross-section of the compensating line 10 is such that the fuel level-equalising effect can be implemented within a short period of time.

In the region of the saddle configuration 6 of the fuel tank 1, at the highest location on the compensating line 10 when the tank is considered in the position of installation thereof, the compensating line 10 has a branch connection thereon, which is connected to a reduced-pressure line 11. The reduced-pressure line 11 in turn is connected to a vacuum chamber of a suction jet pump 12 which is only diagrammatically shown in the drawing but which operates in the usual manner of such a pump. The pump 12 in this case is operated by way of a return flow of fuel, as indicated at 13, from the engine (not shown) of the motor vehicle in which the tank 1 is installed. The fuel being passed through the return 13 is conveyed through a constriction in the suction jet pump, which forms a venturi nozzle. In the region approximately of the narrowest cross-section of the venturi nozzle the reduced-pressure line 11 is connected either directly to the flow cross-section of the venturi nozzle or to a reduced-pressure chamber communicating therewith, so that, in operation of the motor vehicle, the fuel which is returned from the engine to the tank produces a steady constant suction action in the reduced-pressure line. It will be appreciated that there are many possible design configurations in respect of suction jet pumps of that kind and details in that respect are to be found for example in EP 0 228 176 or DE 44 00 919 to which reference is accordingly directed.

In the case of a fuel delivery system which does not involve a return flow of fuel from the engine to the tank, it would be possible for the compensating line 10 to be connected to the delivery flow of fuel, as indicated at 14, to the engine, in a similar manner to the way in which the compensating line 10 is connected to the return flow 13 as described above.

Finally it would alternatively be possible for the compensating line 10 to be connected to a suction jet pump which is provided in any case and which for example in operation of the motor vehicle in which the fuel tank 1 is installed continuously conveys fuel from the second chamber 3 into the first chamber 2 of the fuel tank 1. Such a suction jet pump is in any case not unnecessary in the described configuration according to the invention, for the amount of fuel which in operation of the motor vehicle is drawn by way of the reduced-pressure line 11 is only to be sufficiently great to remove any accumulation of gas in the compensating line 10.

In order to ensure when the engine is stopped that the compensating line 10 does not empty out a check valve as diagrammatically at 15 in FIGS. 1 and 2 is arranged on the compensating line 10.

It will be seen in particular from FIGS. 1 and 2 that the compensating line 10 opens in the first chamber 2 of the fuel tank 1 at a higher level than in the second chamber 3, so that there can be a drop in fuel level from the first chamber 2 to the second chamber 3 only when the level of fuel in the first chamber 2 is above the end of the compensating line 10, which is indicated at 16.

Reference 17 in FIGS. 1 and 2 denotes a refuelling vent valve disposed in the second chamber 3. It will be noted that the first chamber 2 does not include a vent valve of that nature. The vent valve 17 thus constitutes a single common refuelling vent valve for both of the chambers 2 and 3.

The vent valve 17 will respond when a maximum filling level in the second chamber 3 is exceeded, insofar as the vent valve 17 will close in that situation so that a dynamic pressure is built up in the fuel tank 1, and that pressure finally in a refuelling procedure causes the automatic shut-off valve of the refuelling gun to shut off, thereby to terminate the flow of fuel through the filler pipe 7 into the first chamber 2 of the tank 1. It should again be expressly noted at this juncture that the vent valve 17 in the illustrated embodiment is arranged and designed in such a way that the level of fuel of the tank which constitutes the feed shut-off level, as indicated by the dash-dotted line in FIGS. 1 and 2, is slightly below the top of the saddle configuration 6, in both chambers 2 and 3.

It will be appreciated that fuel vapors which are removed from the vent valve 17 are suitably passed to a fuel vapor filter.

Reference will now be made more particularly to FIG. 1 showing the fuel tank 1 according to the invention in the course of a refuelling procedure in a condition in which the level of fuel in the first chamber 2 is higher than in the second chamber 3. In that situation, fuel initially flows across from the first chamber 2 into the second chamber 3 by way of the compensating line 10 if, as shown in FIG. 1, the level of fuel in the first chamber 2 is above the first end 16 of the compensating line 10. Depending on the size of the compensating line 10 and depending on the respective rate of fuel flow into the first chamber 2 through the filler pipe 7 during a refuelling procedure, fuel may possibly additionally flow over the top of the saddle configuration 6 defined by the upwardly displaced portion of the bottom 5 of the fuel tank 1. Refuelling of the fuel tank 1 is possible until the level of fuel in the second chamber 3 has reached the shut-off level, as indicated by the dash-dotted line, at which the vent valve 17 responds. When the vent valve 17 has responded by closing, an increased pressure then builds up in the fuel tank 1 and causes the automatic valve of the refuelling gun to be shut off.

Consideration will now be given to FIG. 2 diagrammatically showing the fuel tank 1 illustrated in FIG. 1, in the course of operation of a motor vehicle in which the fuel tank 1 is installed. The fuel is passed from the first chamber 2 of the fuel tank to the engine by the fuel pump disposed in the fuel delivery unit 8. The fuel which is returned to the chamber 2 by way of the return 13 is operative, by way of the reduced-pressure line 11, to cause fuel to be continuously passed through the compensating line 10 whereby the flow of fuel which in this situation is conveyed in small quantities is fed to the return 13 which appropriately communicates with the reservoir 9. It will be noted that reference 18 denotes a further check valve at the first end 16 of the compensating line 10, to further control the flow therein.

It will be seen that in the condition shown in FIG. 2 the level of fuel in the first chamber 2 is above the level of the fuel in the second chamber 3. In operation of the vehicle, fuel is constantly fed by way of a suction jet line (not shown) from the second chamber 3 to the first chamber 2 or directly to the reservoir 9.

Reference will now be made to FIG. 3 showing a situation in which, for example immediately prior to a refuelling procedure, a relatively large amount of fuel has passed into the second chamber 3 as a consequence of the effect of transverse acceleration acting on the motor vehicle in which the fuel tank 1 is installed. In that condition the level of fuel in the second chamber 3 is above the level of fuel in the first chamber 2, to such an extent that the vent valve 17 has consequently responded by closing. This means that refuelling of the fuel tank 1 would not be possible in that condition, because it would cause the build-up of a dynamic pressure within the whole of the tank, which would cause the automatic shut-off valve of the refuelling gun to shut off. In the FIG. 3 condition, the check valve 15 in the reduced-pressure line 11 is also closed so that, in a situation in which the first end 16 of the compensating line 9 is no longer immersed in the fuel in the first chamber 2, the compensating line 10 cannot run empty.

In the condition shown in FIG. 3, the compensating line 10 acting as a siphon will then quickly cause equalisation of the level in the chambers 2 and 3, when there is a fall in level from the second chamber 3 to the first chamber 2, thus resulting in the condition shown in FIG. 4 so that the vent valve 17 can then open again. That will therefore permit venting of the fuel tank 1 during a refuelling procedure which is made possible as a consequence.

It should be noted at this point that it is not necessary for a check valve to be also provided at the first end 16 of the compensating line 10. In that situation, even in the condition shown in FIG. 2, there will be a fall from the first chamber 2 to the second chamber 3, assuming that the level of fuel in the first chamber 2 does not fall below the level of the first end 16 of the compensating line 10.

Looking again at FIG. 2, reference numeral 19 therein denotes an overflow container into which the first end 16 of the compensating line 10 extends. The purpose of the container 19 is to ensure that the first end 16 of the compensating line 10 still remains immersed in fuel even in the event of surge movements of the fuel caused for example by rolling movements or transverse acceleration effects on the vehicle in which the fuel tank 1 is installed.

It will be appreciated that the above-described embodiment of the fuel tank according to the invention has been set forth solely by way of example and illustration of the principles thereof and that various modifications and alterations may be made therein without thereby departing from the spirit and scope of the invention.

What is claimed is:

1. A fuel tank for a motor vehicle, comprising at least first and second tank regions of relatively large cross-section forming respective communicating sub-volumes of the tank, a tank region of smaller cross-section forming the communication between the first and second tank regions, wherein the tank region of smaller cross-section in the position of installation of the tank is formed by an upward incursion of the tank bottom into the tank interior between said first and second tank regions, at least one fuel delivery unit in the first tank region, means for venting the tank in the form of only a single common refuelling vent valve for the first and second region of the tank and arranged in the second tank region, at least one compensating line which interconnects the first and second tank regions on the basis of the principle of communicating tubes, means for venting the compensating line, the compensating line being such that equalisation of the filling levels of the intercommunicating first and second tank regions is possible at least at a low filling level only in the event of such a fall in level at which the filling level in the first tank region is less than in the other regions of the tank.

2. A fuel tank as set forth in claim 1 wherein the compensating line has a first end opening into the first tank region at a higher level than in the second tank region.

3. A fuel tank as set forth in claim 2 and including a check valve at the first end of the compensating line.

4. A fuel tank as set forth in claim 2 and including an overflow container in which the first end of the compensating line is received for flow communication therebetween.

5. A fuel tank as set forth in claim 1 wherein the compensating line has a branch therefrom, and further including
   a reduced-pressure line connected to said compensating line at said branch.

6. A fuel tank as set forth in claim 5 including
a pump adapted to be operated by a partial fuel flow branched from a fuel delivery flow from the fuel delivery unit,
wherein the reduced-pressure line is connected to said pump.

7. A fuel tank as set forth in claim 5 including
a pump adapted to be operated by a partial fuel flow branched from a fuel return flow,
wherein the reduced-pressure line is connected to said pump.

8. A fuel tank as set forth in claim 5 and further including a check valve in said reduced-pressure line.

9. A fuel tank as set forth in claim 1 wherein the tank region of smaller cross-section is arranged in the position of installation of the tank above the maximum filling level of the first and second tank regions, said maximum filling level being predetermined by the refuelling vent valve.

10. A fuel tank comprising
   at least first and second tank regions respectively forming first and second chambers of the tank,
   a further tank region of smaller cross-section than the first and second tank regions and providing a communication between the first and second chambers wherein the further tank region in the position of installation of the tank is in the upper part of the tank,
   at least one fuel delivery unit in the first chamber,
   means for venting the tank comprising a vent valve for the first and second chambers of the tank and arranged only in the second chamber,
   at least one compensating line which interconnects the chambers, for fuel level equalisation therein,
   means for venting the compensating line,
   the arrangement of the compensating line being such that equalisation of the filling levels of the intercommunicating chambers is possible at least at a low filling level only in the event of a drop in level at which the filling level in the first chamber is less than in the second chamber.

* * * * *